(12) United States Patent
Hein et al.

(10) Patent No.: US 7,448,656 B1
(45) Date of Patent: Nov. 11, 2008

(54) DUAL ACTION STRUCTURAL LATCH

(75) Inventors: Jeffrey M. Hein, Tempe, AZ (US);
Nicholas A. Williams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/741,872

(22) Filed: Apr. 30, 2007

(51) Int. Cl.
*E05C 5/02* (2006.01)
(52) U.S. Cl. .................... 292/113; 244/129.4
(58) Field of Classification Search ............... 292/113, 292/247; 244/129.4
See application file for complete search history.

(56) References Cited

U.S. PATENT DOCUMENTS

| | | | |
|---|---|---|---|
| 2,714,032 A * | 7/1955 | Mills | ............ 292/247 |
| 2,978,266 A | 4/1961 | Poe | |
| 4,127,305 A | 11/1978 | Nielsen | |
| 4,365,775 A | 12/1982 | Glancy | |
| 4,369,937 A * | 1/1983 | LeBell et al. | ............ 244/53 R |
| 4,421,349 A | 12/1983 | Greiert, Jr. | |
| 4,531,769 A | 7/1985 | Glancy | |
| 4,743,052 A | 5/1988 | Stammreich et al. | |
| 4,758,031 A * | 7/1988 | Wolf | ............ 292/111 |
| 4,768,815 A | 9/1988 | Harmon | |
| 4,826,221 A | 5/1989 | Harmon | |
| 4,828,299 A | 5/1989 | Poe | |
| 5,435,615 A * | 7/1995 | Schmitz | ............ 296/121 |
| 5,556,142 A | 9/1996 | Zankich | |
| 6,343,815 B1 | 2/2002 | Poe | |
| 6,729,661 B2 | 5/2004 | Perez-Sanchez | |
| 7,066,501 B2 * | 6/2006 | Meineke et al. | ............ 292/110 |

* cited by examiner

*Primary Examiner*—Gary Estremsky
(74) *Attorney, Agent, or Firm*—Ingrassia, Fisher & Lorenz, P.C.

(57) ABSTRACT

A dual action structural latch (10) is provided for securing hinged access doors to a frame. The latch (10) comprises a latching member (58) secured to the frame and defining a first aperture (60). A hook member (24) engages the latching member (58) to resist a tensile force when the latch (10) is in a closed position, and disengages the latching member (58) when the latch (10) is in the open position. A shear pin (36) extends so as to engage within the first aperture (60) to resist a shear force when the latch (10) is in the closed position and to disengage the first aperture (60) when the latch (10) is in the open position. A handle (20), when moved from the closed position to the open position, sequentially withdraws the shear pin (36) from the first aperture (60) and disengages the hook member (24) from the latching member (58), and when moved from the open position to the closed position, sequentially engages the hook member (24) with the latching member (58) and inserts the shear pin (36) in the first aperture (60).

9 Claims, 2 Drawing Sheets

DUAL ACTION STRUCTURAL LATCH

FIELD OF THE INVENTION

The present invention generally relates to latches and more particularly to a dual action structural latch for securing aircraft hinged access doors.

BACKGROUND OF THE INVENTION

Modern aircraft are equipped with a large number of external access panels that are flush mounted so as to provide an aerodynamic, low drag surface when airborne. These external access panels conventionally allow access to, for example, hydraulic, electronic, and engine or engine systems. In order to maintain a panel in the closed position, while still providing quick access to the area behind the panel while the aircraft is parked on the ground, low-profile flush mounted latches of the over-center tension type typically are incorporated into the design of the panel for securing the panel to the aircraft frame. For example, see U.S. Pat. Nos. 4,743,052 and 6,343,815.

When the size of the panel exceeds a certain limit, there is a need to incorporate one or more shear pins into the panel as well. The shear pin maintains the structural rigidity of the panel in the closed position when twisting loads are present. Latches capable of supporting both tension loading and shear loading are known. For example, see U.S. Pat. No. 5,556,142 which describes a combination tension-shear latch of the rotary hook type. However, this rotary action is unsuitable for applications which must be flush mounted to panels with complex curvatures and is prohibitively large for smaller panel applications exhibiting minimal loading.

Furthermore, when an aircraft incorporates both over-center latches and shear pins, it is often difficult for one person to close the panel, as all the latches and pins must be aligned simultaneously. In a typical regional jet application, the access panels for the tailcone may incorporate two over-center latches and two shear pins, requiring the simultaneous alignment of four features to properly close the panel. In commercial aircraft having significantly larger panels, it is not uncommon to have six or eight features.

Accordingly, it is desirable to provide a dual action structural latch suitable for opposing tension and shear loads and which may be operated by one person. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A dual action structural latch is provided for securing aircraft hinged access doors to a frame. The latch of one exemplary embodiment comprises a latching member secured to the frame and defining a first aperture. A cross member defines a second aperture and is rotationally coupled to the frame. A primary link comprises a first end coupled to the cross member by a first joint, and an ear formed at a second end. A handle is rotationally mounted to the ear by a second joint and is moveable between a closed position and an open position. A hook member is rotationally mounted to the primary link near the second end by a third joint and engages the latching member when the handle is in the closed position and disengages the latching member when the handle is in the open position. A shear link is rotationally mounted to the handle by a fourth joint. A shear pin is rotationally mounted to the shear link by a fifth joint and extends through the second aperture and beyond the first end of the primary link so as to engage within the first aperture when the handle is in the closed position and disengage the first aperture when the handle is in the open position.

In operation, when the handle is rotated around the second joint to an open position, the shear pin is withdrawn from the first aperture in the latching member, the primary link is rotated counterclockwise around the first joint, the hook member is disengaged from the latching member, a vector between the first aperture and third joint passes through the second aperture enabling an over-center feature, and the hook member is rotated around the third joint and away from the latching member. When the handle is rotated around the second joint to a closed position, the hook member is rotated around the third joint and toward the latching member, the vector between the first aperture and third joint passes through the second aperture, the hook member is engaged with the latching member, the primary link is rotated clockwise around the first joint; and the shear pin is engaged with the aperture in the latching member.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A compact low profile over-center tension latch assembly including an integral, retractable shear pin reduces the difficulty in closing panels, thus allowing simultaneous engagement of two features at one location and in one operator motion, effectively reducing the resources required to properly close the panel. The latch may be used in aerospace applications with very demanding envelope requirements. Incorporation of the retractable shear pin into the latch assembly allows greater convenience to operators as well as potential reductions in aircraft weight.

Figure 1:
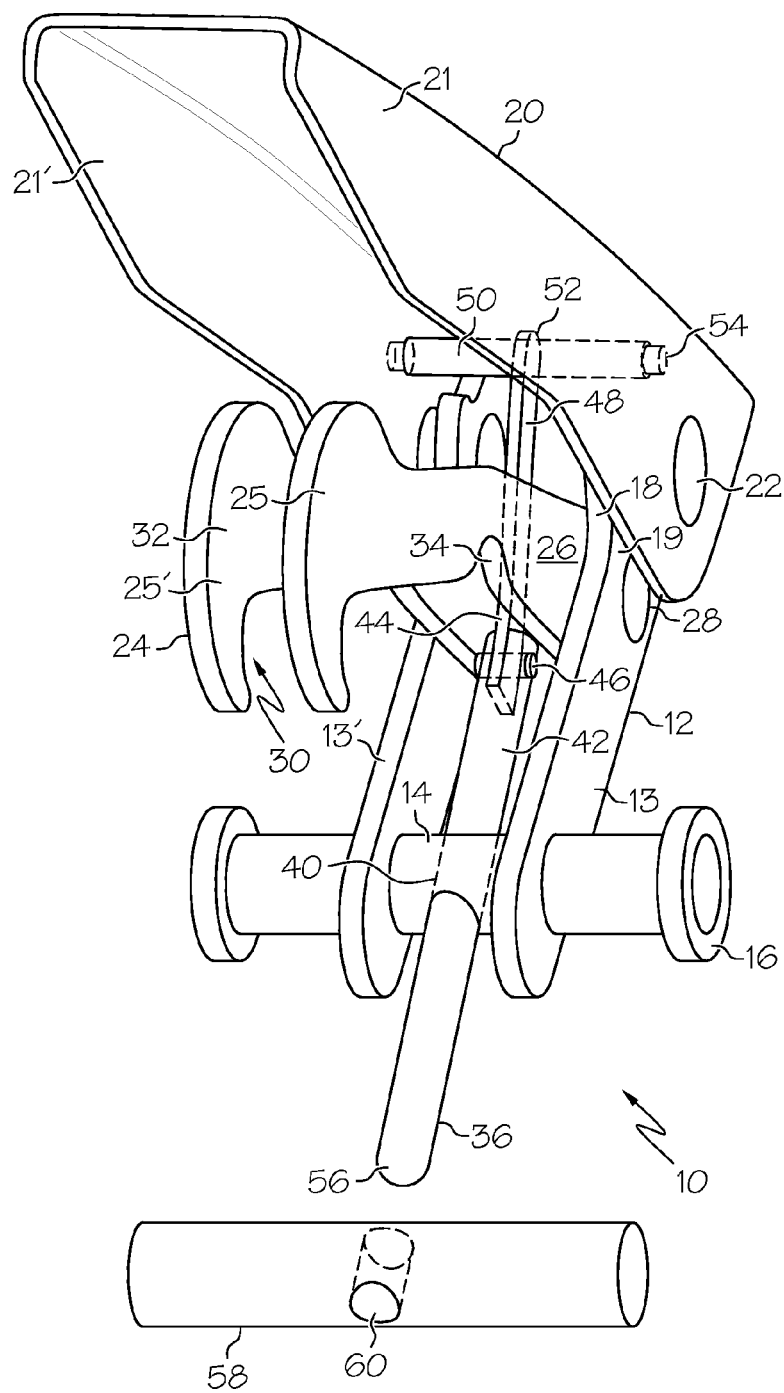
FIG. 1 is an isometric view of an exemplary embodiment in an open position.
Figure 2:
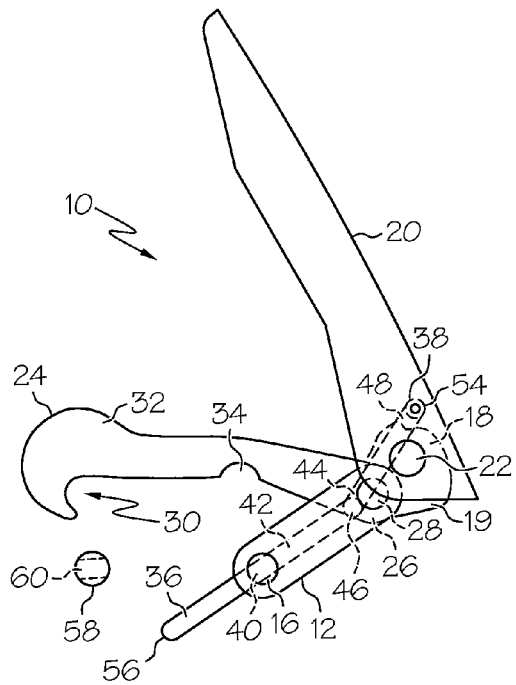
FIG. 2 is a side view of the exemplary embodiment in the open position.

Referring to the isometric view of FIG. 1 and the side view of FIG. 2, an exemplary embodiment of the dual action structural latch assembly 10 is shown in an open position. The latch assembly 10 may be used to secure any panel, or access door, to a frame, but the preferred use is envisioned for aircraft access doors to compartments wherein aircraft systems, such as, hydraulic (e.g., pumps), electronic (e.g., generators), engine or engine systems (e.g., compressors), are maintained. The aircraft frame as used herein refers to the structure surrounding the compartment to which the latch assembly 10 is providing access, and may be integrally formed with the aircraft, secondarily attached thereto, or be included as part of a keeper assembly with the latch assembly 10. The open position is generally used when the aircraft is on the ground, when access to equipment behind the panel is desired. A primary link, or quaternary member, 12 is mounted by a cross member 14 rotationally coupled to the aircraft frame (not shown) through a closed revolute joint 16. Revolute joints known in the industry include male and female components and are not explicitly described herein. The primary link 12 includes an ear 18 extending from a second, or aft, end 19. A handle 20 is rotationally mounted at the ear 18 to the primary link 12 by a closed revolute joint 22. The handle 20 is a binary link positioned within an opening in the access door (not shown) for ease of access and preferably comprises a longitudinal member with a transverse cross-sectional shape having flanges 21, 21' approximating a "U" having a channel width sufficient for containing the primary link 12. To prevent an inadvertent disengagement of the latch, the handle 20 may include a secondary locking feature, designed to require deliberate operator action before the handle can rotate from the closed position. Such features are typical within the Latch Industry, and are not explicitly described herein. A hook member 24 is rotationally mounted at a first end 26 to the primary link 12 by a closed revolute joint 28. The hook member 24 comprises a binary link having an aftly concave hook 30 at a second end 32. The hook member 24 defines a relief 34 positioned approximately midspan of the hook member 24 to allow for clearance with the cross member 14 when the latch assembly 10 is in the closed position.

It will be appreciated that while the preferred primary link 12 comprises two similar parallel longitudinal members 13, 13' spaced apart by the cross member 14, and the hook member 24 comprises dual members 25, 25', providing for symmetrical application of forces, the latch apparatus 10 may be designed with single members 13 and 25. The two members 13, 13' are separated a distance sufficient to allow the hook member 24, a shear pin 36 and a shear link 38 to be disposed therebetween. The cross member 14 extends outboard from each longitudinal member and forms the interface for the joint 16. A longitudinal aperture 40 is formed in the cross member 14, which forms a prismatic joint with the shear pin 36. The dual members 25, 25' comprising the hook member 24 preferably comprises two similar parallel longitudinal members which may optionally be coupled by a cross member (not shown). The dual members 25, 25' are separated a distance sufficient to allow the shear link 38 to be disposed therebetween.

The shear pin 36 is a ternary link rotationally mounted at a first, or aft, end 42 to a first, or forward, end 44 of the shear link 38 by a closed revolute joint 46 and extends through the aperture 40 (closed prismatic joint) in the cross member 14. A second, or aft, end 48 of the shear link 38 is rotationally mounted to a cross member 50 by joint 52 and is rotationally mounted to first and second flanges 21, 21' of the handle 20 at closed revolute joints 54. The shear pin 36 and shear link 38 may be formed integrally with a link or may be installed separately. A second end 56 of the shear pin 36 is of a form suitable, e.g., a bullnose, for self-piloting into the aperture 60.

The latch assembly 10 further includes a latching member 58 mounted to the aircraft frame (not shown). The latching member, or striker pin, 58 comprises a prismatic joint that defines an aperture 60 for securing the shear pin 36 when the latch assembly 10 is in the closed position.

Figure 3:
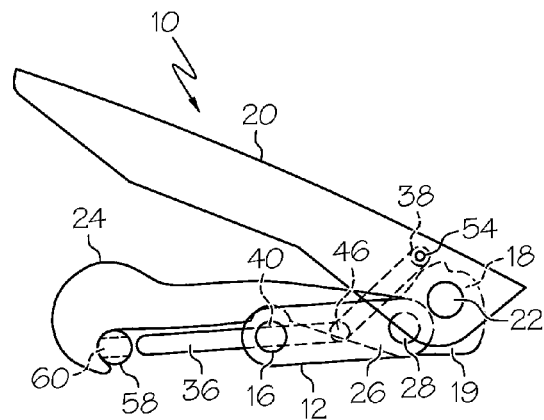
FIG. 3 is a side view of the exemplary embodiment in a partially closed position.

To close the latch assembly 10, pressure is applied to the handle 20 (FIG. 2) in a counterclockwise direction (towards the latching member 58). The hook member 24 will move to contact the latching member 58 and a downward force on the aft end 19 of the primary link 12 via the handle 20 which causes the primary link 12 to rotate clockwise around closed revolute joint 16 and engage the over-center mechanism (FIG. 3 shows the latch assembly 10 in a partially closed/open position). The over-center mechanism comprises moving the vector established between joint 60 and joint 28, passing through and below joint 16 during movement of the handle 20.

Figure 4:
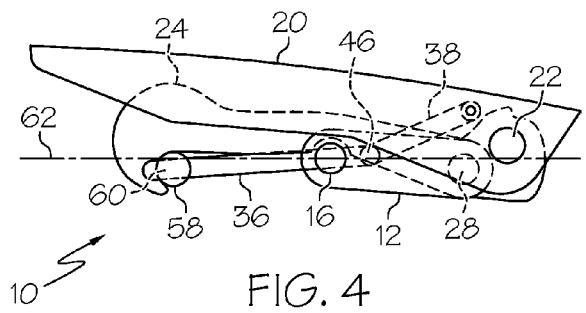
FIG. 4 is a side view of the exemplary embodiment in a closed position.

As the pressure is continued to be applied to handle 20, the handle 20 will rotate counter-clockwise about closed revolute joint 22, thereby causing the shear link 38 to impart motion on the shear pin 36 to engage the aperture 60 (FIG. 4). The primary link 12 extends nominally parallel to the approximated major axis 62 of the latch assembly 10 in the closed position.

To open the latch assembly 10, pressure is applied to the handle 20 to move it in a clockwise direction around joint 22 (away from the latching member 58). The shear link 38 withdraws the shear pin 36 completely from the aperture 60. Note that the shear pin 36 remains within aperture 40. As the handle continues to rotate clockwise around joint 22, the primary link 12 rotates counterclockwise around the joint 16. The vector from the latching member 58 to joint 28 passes through and above joint 16, releasing the tension in the hook member 24, which disengages from latching member 58. As the latch assembly 10 continues to rotate counterclockwise about joint 16, the hook member 24 freely rotates clockwise about joint 28 until the latch assembly 10 is completely disengaged as shown in FIGS. 1 and 2.

Thus, an improved dual action structural latch for securing aircraft hinged access doors and suitable for opposing tension and shear loads may be operated by one person in one swift motion.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A dual action structural latch for securing an access door to a frame, the latch comprising:

a latching member secured to the frame and defining a first aperture;

a primary link;

a shear link;

a hook member rotationally attached to the primary link for engaging the latching member when the latch is in a closed position to resist a tensile force, and for disengaging the latching member when the latch is in the open position, including an over-center mechanism where a vector between the latching member and the joint between the hook member and the primary link passes below a joint containing the second aperture when moving between the open and closed positions;

a shear pin extending so as to engage within the first aperture when the latch is in the closed position to resist a shear force and to disengage the first aperture when the latch is in the open position;

a cross member rotationally coupled to the frame and defining a second aperture having the shear pin extending therethrough, the primary link having a first end rotationally coupled to the cross member; and a handle rotationally attached to the primary link and coupled to the shear pin by the shear link, the shear link reacting a pivotal action of the handle to a translation motion of the shear pin for, when moved from the closed position to the open position, sequentially withdrawing the shear pin from the first aperture and disengaging the hook member from the latching member, and when moved from the open position to the closed position, sequentially engaging the hook member with the latching member and inserting the shear pin in the first aperture.

2. The dual action structural latch of claim 1 wherein the primary link comprises two similar parallel longitudinal members spaced on opposed sides of the shear pin; and the hook member comprises two similar parallel longitudinal members spaced on opposed sides of the shear pin.

3. The dual action structural latch of claim 1 wherein the frame comprises one of a) integrally formed with an aircraft, b) secondarily attached to the aircraft, and c) included as part of a keeper assembly for attachment to the aircraft.

4. A dual action structural latch for securing an access door to a frame, the latch comprising:

a latching member secured to the frame and defining a first aperture;

a cross member defining a second aperture and rotationally coupled to the frame;

a primary link having a first end coupled to the cross member by a first joint, and an ear formed at a second end;

a handle rotationally mounted to the ear by a second joint, the handle moveable between a closed position and an open position;

a hook member rotationally mounted to the primary link near the second end by a third joint, the hook member engaging the latching member when the handle is in the closed position and disengaging the latching member when the handle is in the open position;

a shear link rotationally mounted to the handle by a fourth joint; and a shear pin rotationally mounted to the shear link by a fifth joint and extending through the second aperture, and extending beyond the first end of the primary link so as to engage within the first aperture when the handle is in the closed position and disengage the first aperture when the handle is in the open position.

5. The dual action structural latch of claim 4 further defining an over-center mechanism when a vector between the latching member and the third joint passes through a joint containing the second aperture when the handle is moving between the open and closed positions.

6. The dual action structural latch of claim 4 wherein the primary link comprises two similar parallel longitudinal members spaced on opposed sides of the shear link and the shear pin; and the hook member comprises two similar parallel longitudinal members spaced on opposed sides of the shear link.

7. The dual action structural latch of claim 4 wherein the frame comprises one of 1) integrally formed with an aircraft, and 2) secondarily attached to the aircraft.

8. The dual action structural latch of claim 4 further comprising a keeper assembly for attachment to the frame, and the frame comprises a portion of an aircraft.

9. A method of operating a dual action structural latch for securing an access door to a frame; the latch comprising a latching member secured to the frame and defining a first aperture; a cross member rotationally coupled to the frame and defining a second aperture; a primary link having a first end rotationally coupled to the cross member at a first joint, and an ear formed at a second end; a handle rotationally mounted to the ear by a second joint; a hook member rotationally mounted to the primary link near the second end by a third joint, the hook member engaging the latching member when the handle is in a closed position; a shear link rotationally mounted to the handle by a fourth joint; and a shear pin rotationally mounted to the shear link by a fifth joint and extending through the second aperture, and extending beyond the first end of the primary link so as to engage within the first aperture when the handle is in the closed position; the method comprising:

rotating the handle around the third joint to an open position, thereby creating the steps comprising;
  withdrawing the shear pin from the first aperture in the latching member;
  rotating the primary link counterclockwise around the first joint;
  disengaging the hook member from the latching member;
  passing the vector between the latching member and third joint through and above a joint containing the second aperture;
  rotating the hook member around the third joint and away from the latching member; and rotating the handle around the second joint to a closed position, thereby creating the steps comprising:
  rotating the hook member around the third joint and toward the latching member;
  passing the vector between the latching member and third joint through and below a joint containing the second aperture;
  engaging the hook member with the latching member;
  rotating the primary link clockwise around the first joint; and
  engaging the shear pin with the first aperture in the latching member.

* * * * *